US012538998B2

(12) United States Patent
Fei et al.

(10) Patent No.: US 12,538,998 B2
(45) Date of Patent: Feb. 3, 2026

(54) BABY BOTTLE WARMER

(71) Applicant: Chunling Ye, Jiangxi (CN)

(72) Inventors: Ming Fei, Jiangxi (CN); Chunling Ye, Jiangxi (CN)

( * ) Notice: Subject to any disclaimer, the term of this patent is extended or adjusted under 35 U.S.C. 154(b) by 321 days.

(21) Appl. No.: 17/895,516

(22) Filed: Aug. 25, 2022

(65) Prior Publication Data
US 2023/0284826 A1    Sep. 14, 2023

(30) Foreign Application Priority Data

Mar. 8, 2022 (CN) .................... 202210226906.X

(51) Int. Cl.
*A47J 36/24* (2006.01)

(52) U.S. Cl.
CPC ................ *A47J 36/2433* (2013.01)

(58) Field of Classification Search
CPC ........... A47J 36/2433; A47J 36/2438; A47J 36/2483; A47J 36/2411; F25D 3/06; F25D 2331/809; F25D 2600/04; F25D 2331/803; F25D 2303/08223; F25D 31/007; B08B 9/32; B08B 9/28; A61J 9/00; B65D 85/36; B65D 83/76; B65D 81/22; B65D 83/764; B65D 21/08
USPC .................. 220/592.01–592.28; 99/319, 99/421 R–421 M, 477, 483, 630–633; 219/385–553, 725–735; 221/262–280; 134/57 D, 153, 152, 135, 58 D
See application file for complete search history.

(56) References Cited

U.S. PATENT DOCUMENTS

| | | | | |
|---|---|---|---|---|
| 4,013,001 A * | 3/1977 | Yasuhiro | .................. | A23N 4/04 99/563 |
| 4,450,757 A * | 5/1984 | Alfio | ....................... | A47J 27/18 99/336 |
| 4,852,471 A * | 8/1989 | Lansing | .............. | A47J 37/1228 126/299 R |
| 5,018,438 A * | 5/1991 | Grandi | ..................... | A21B 7/00 99/335 |
| 5,469,782 A * | 11/1995 | Wong | .................... | A47J 27/004 99/644 |
| 6,412,401 B1 * | 7/2002 | Mariotti | ................ | A47J 37/128 99/410 |
| 10,051,994 B2 * | 8/2018 | Dunn | .................. | A47J 36/2438 |
| 2003/0188769 A1 * | 10/2003 | Eisenberg | ................ | B08B 9/32 134/152 |
| 2004/0154471 A1 * | 8/2004 | Tardif | ..................... | A47J 31/20 99/279 |
| 2008/0149661 A1 * | 6/2008 | Sines | ..................... | B65D 85/36 221/279 |
| 2008/0237104 A1 * | 10/2008 | Foster | ..................... | A47J 36/38 210/167.28 |
| 2009/0120303 A1 * | 5/2009 | Popeil | ................. | A47J 37/1219 99/403 |

(Continued)

Primary Examiner — Eric S Stapleton

(57) ABSTRACT

Disclosed is a baby bottle warmer, including a machine body, a baby bottle basket and a lifting device. The lifting device includes a rotating member, the rotating member rotates to drive the baby bottle basket to move up or down; and since the rotating member is always located on the same plane and position during rotation, a heating plate is arranged in the rotating member without affecting the function of the rotating member. Furthermore, the baby bottle warmer provided by the present disclosure has a compact and exquisite structure.

11 Claims, 4 Drawing Sheets

(56) References Cited

U.S. PATENT DOCUMENTS

| | | | | |
|---|---|---|---|---|
| 2009/0126762 A1* | 5/2009 | Nomura | .................... | B08B 7/00 |
| | | | | 134/18 |
| 2010/0297321 A1* | 11/2010 | Strauch | ............... | A47J 37/0718 |
| | | | | 426/523 |
| 2012/0061376 A1* | 3/2012 | McBean | ............. | A47J 36/2438 |
| | | | | 219/430 |
| 2012/0328750 A1* | 12/2012 | Giordano | ................ | A47J 31/20 |
| | | | | 426/433 |
| 2014/0170280 A1* | 6/2014 | St. Germain | ........... | A47J 31/60 |
| | | | | 426/433 |
| 2016/0015209 A1* | 1/2016 | Dunn | .................. | A47J 36/2438 |
| | | | | 99/483 |
| 2017/0027413 A1* | 2/2017 | Gerstner | ............... | A47L 15/506 |
| 2022/0257053 A1* | 8/2022 | Bate | ........................ | A47J 36/32 |

* cited by examiner

BABY BOTTLE WARMER

FIELD OF TECHNOLOGY

The present disclosure relates to the technical field of baby bottle warmers, and in particular to a baby bottle warmer.

BACKGROUND

Nowadays, there are various baby bottle warmers on the market, and existing baby bottle warmers also have a jacking function. Specifically, a jacking structure is driven by a motor to realize lifting control of a baby bottle basket. The jacking structure and the driving motor are generally arranged at the bottom of the baby bottle warmer and occupy a large space, thereby affecting the arrangement position of a heating plate in the baby bottle warmer.

The China patent with the publication number CN104887098A discloses a lifting mechanism for a baby bottle warmer self-heating device. A lifting structure is arranged at the bottom of a mounting platform, a first connecting rod and a second connecting rod are driven by a motor to be hinged and rotate crosswise to lift the mounting platform. The structure has the disadvantages that the lifting structure and the motor occupy most of space at the bottom of the baby bottle warmer. On one hand, a heating plate is generally arranged at the bottom of a baby bottle basket, but in the comparison design, when the mounting platform is driven to move up, the mounting platform and the heating plate will move up and down synchronously, and the unfixed mounting mode of the heating plate will lead to functional failure of the heating plate due to poor contact after long-term use; and on the other hand, if the heating plate is arranged at the periphery of the baby bottle basket, the whole structure of the baby bottle warmer will be enlarged, resulting in that the baby bottle warmer is large and inconvenient for a user to use.

SUMMARY

An objective of the present disclosure is to provide a baby bottle warmer. A rotating member rotates to move a baby bottle basket up and down, so that a heating plate can be arranged at the bottom of the baby bottle basket, and the whole structure of the baby bottle warmer is compact and exquisite.

To achieve the above object, the present disclosure adopts the following technical solutions:

a baby bottle warmer includes:
a machine body;
a baby bottle basket, arranged at an opening of the machine body, and
a lifting device, arranged in the machine body,
where the lifting device includes a rotating member and drives the baby bottle basket to move up or down through rotation of the rotating member.

Compared with the prior art, a baby bottle warmer provided by the present disclosure includes a machine body, a baby bottle basket and a lifting device. The lifting device includes a rotating member, the rotating member rotates to drive the baby bottle basket to move up or down; and since the rotating member is always located on the same plane and position during rotation, a heating plate is arranged in the rotating member without affecting the function of the rotating member. The baby bottle warmer provided by the present disclosure has a compact and exquisite structure.

Further, the lifting device further includes:
a guide column, movably arranged on the rotating member; and
the rotating member rotates to move the guide column up or down so as to drive the baby bottle basket to move up or down.

Further, a lifting guide rail is arranged on a peripheral wall of the rotating member;
the lifting guide rail obliquely extends downwards from a part of an upper end of the rotating member as a starting point to a lower end of the rotating member; and
the rotating member rotates, so that the guide column is guided by the lifting guide rail to move up or down.

Further, the lifting guide rail includes:
a first horizontal guide rail, close to the upper end of the rotating member;
a second oblique guide rail, connected to one end of the first horizontal guide rail and obliquely extending to be arranged on the rotating member, and
a third horizontal guide rail, connected to one end of the second oblique guide rail and close to the lower end of the rotating member.

Further, the lifting guide rail further includes:
a through hole, connected to one end of the third horizontal guide rail.

Further, the guide column includes:
a connecting rod; and
a sleeving piece, sleeved at a lower end of the connecting rod,
where a traction column is fixed on the sleeving piece and arranged in the lifting guide rail.

Further, an opening of the baby bottle basket is provided with an outward protruded edge extending and protruding outwards; and
an upper end of the guide column always abuts against a bottom surface of the outward protruded edge when the baby bottle basket moves up and down.

Further, a top cap is arranged on an end part of the traction column and is in fit with the sleeving piece to clamp and position the traction column in the lifting guide rail.

Further, the lifting device further includes:
a driving motor, configured to provide a rotating power, where a driving shaft of the driving motor is provided with a transmission gear; and
first rotating teeth, arranged at the bottom of the rotating member, where a tooth direction of the first rotating teeth is vertically downward,
the transmission gear and the first rotating teeth are mutually engaged, and the driving motor drives the transmission gear to rotate so as to rotate the rotating member.

Further, the lifting device further includes:
a driving motor, configured to provide a rotating power, where a driving shaft of the driving motor is provided with a transmission gear, and
second rotating teeth, arranged at the bottom of the rotating member, where a tooth direction of the second rotating teeth is horizontally outward,
the transmission gear and the first rotating teeth are mutually engaged, and the driving motor drives the transmission gear to rotate so as to rotate the rotating member.

For better understanding and implementation, the present disclosure is described in detail below with reference to the accompanying drawings.

BRIEF DESCRIPTION OF THE DRAWINGS

FIG. 1 is a schematic diagram of an overall structure of a baby bottle basket, a guide column, a rotating member and a driving device which a lifting structure according to this embodiment relates to;

FIG. 3 is a structural schematic diagram of a rotating member which a lifting structure according to this embodiment mainly relates to;

DETAILED DESCRIPTION OF THE EMBODIMENTS

Figure 1:
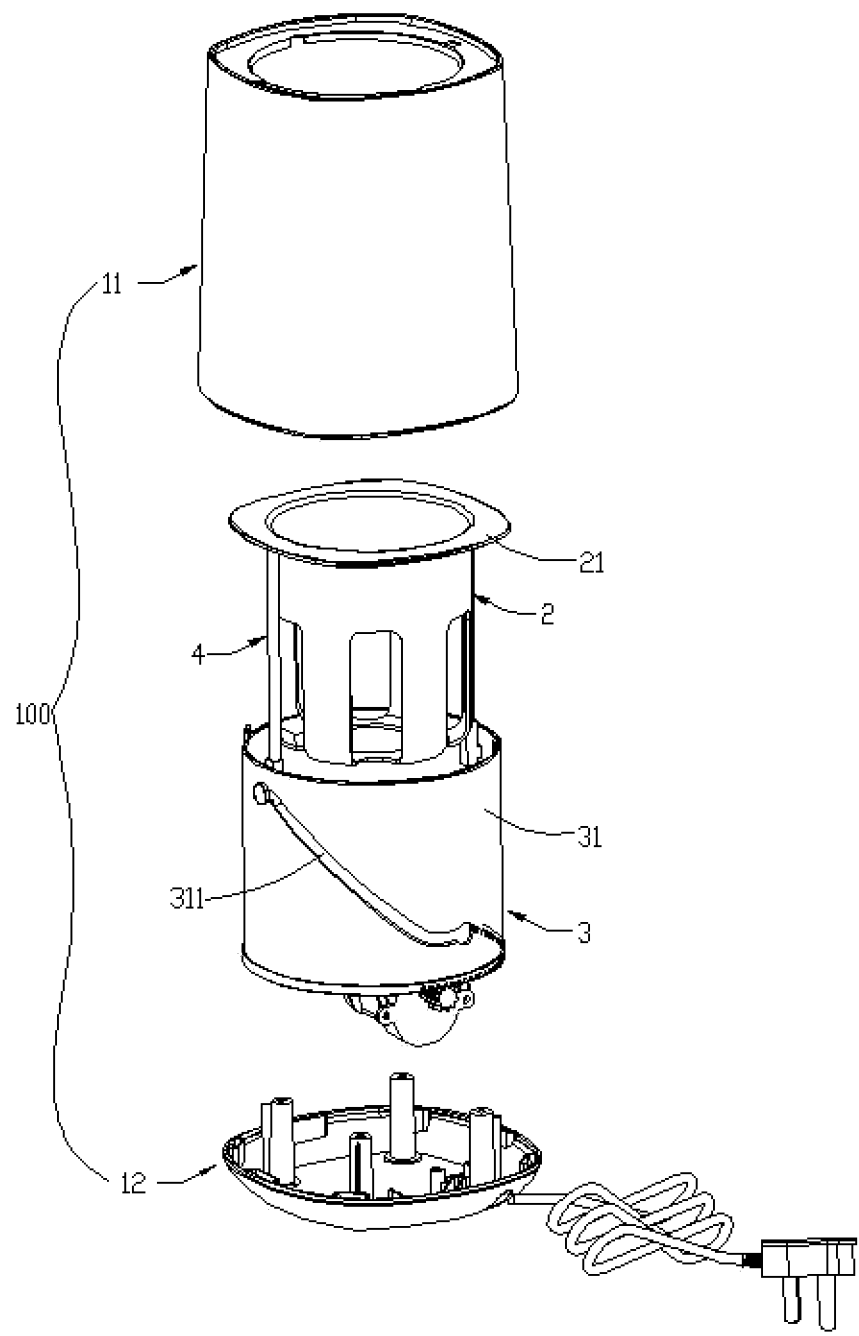

To better illustrate the present disclosure, the present disclosure is further described in detail below with reference to the accompanying drawings.

It should be clear that the described embodiments are merely a part rather than all of the embodiments of the present application. All other embodiments obtained by a person of ordinary skill in the art based on the embodiments in the embodiments of the present application without creative efforts shall fall within the protection scope of the embodiments of the present application.

Terms used in the embodiments of the present application are only for describing specific embodiments, and are not intended to limit the embodiments of the present application. As used in the embodiments of the present application and the appended claims, the singular forms "a", "the" and "this" are intended to include the plural forms, unless the context clearly indicates other meanings. It should be understood that the term "and/or" used herein refers to and includes any or all possible combinations of one or more of the associated listed items.

When the following description hereinafter refers to the accompanying drawings, the same reference numerals in different drawings represent the same or similar elements, unless otherwise represented. The implementation manners described in the following exemplary embodiments do not represent all implementation manners consistent with the present application. Instead, they are merely examples of devices and methods consistent with some aspects of the present application described as detailed in the appended claims. In the description of the present application, it should be understood that terms "first", "second" and "third" are only used to distinguish similar objects, are unnecessarily used to describe a specific order or sequence, and cannot be understood as indicating or implying relative importance. A person of ordinary skill in the art may understand specific meanings of the above-mentioned terms in the present application based on the specific situation.

In addition, in the description of the present application, unless otherwise specified, "a plurality of" means two or more. "And/or", which describes a relationship of associated objects, indicates that three relations may be presented, for example, A and/or B may indicate three cases: A is present alone, A and B are present at the same time, or B is present alone. The character "/" herein generally indicates that the associated objects are in an "or" relationship.

Nowadays, there are various baby bottle warmers on the market, and existing baby bottle warmers also have a jacking function. Specifically, a jacking structure is driven by a motor to realize lifting control of a baby bottle basket. The jacking structure and the driving motor are generally arranged at the bottom of the baby bottle warmer and occupy a large space, thereby affecting the arrangement position of a heating plate in the baby bottle warmer.

Therefore, the technical problem actually solved by the present disclosure is how to adjust the lifting structure of the baby bottle warmer so as to adapt to the mounting position of the heating plate.

As an exemplary example of the present disclosure, as shown in FIG. 1, a baby bottle warmer includes:
 a machine body 1, for example, the machine body includes a shell 11 and a base 12, and the shell 11 and the base 12 form a container with an opening at one end;
 a baby bottle basket 2, arranged at the opening of the machine body 1; and
 a lifting device 3, arranged in the machine body 1,
 where the lifting device 3 includes a rotating member 31 and drives the baby bottle basket 2 to move up or down through rotation of the rotating member 31, for example, the rotating member 31 may be a ring-shaped guide cylinder or a ring-like cylindrical structure so as to ensure that the rotating member 31 is always on the same curved surface during rotation.

A baby bottle warmer in this embodiment includes a machine body 1, a baby bottle basket 2 and a lifting device 3, where the lifting device 3 includes a rotating member 31; the rotating member 31 rotates to drive the baby bottle basket 2 to move up or down; and since the rotating member 31 is always located on the same plane and position during rotation, a heating plate may be arranged in the rotating member 31 without affecting the function of the rotating member 31. Furthermore, the baby bottle warmer provided by the present disclosure has a compact and exquisite structure.

In this embodiment, as shown in FIG. 1, the lifting device 3 further includes:
 a guide column 4, movably arranged on the rotating member 31; and
 the rotating member 31 rotates to move the guide column 4 up or down so as to drive the baby bottle basket 2 to move up or down.

The guide column 4 moves relative to the rotating member 31 in a staggered manner when the rotating member 31 rotates, and the baby bottle basket 2 is dragged by one end of the guide column 4, so that the baby bottle basket 2 moves up or down with the up-and-down movement of the guide column 4.

A lifting guide rail 311 is arranged on a peripheral wall of the rotating member 31. The lifting guide rail may be partially hollowed out in the rotating member 31, or two parallel edges are formed on an inner wall of the rotating member 31 to form the lifting guide rail 311.

In this embodiment, as shown in FIG. 1, taking the case where the lifting guide rail 311 is partially hollowed out in the rotating member 31 as an example, the lifting guide rail 311 obliquely extends downwards from a part of an upper end of the rotating member 31 as a starting point to a lower end of the rotating member 31, and a lower end of the guide column 4 is movably mounted in the lifting guide rail 311;

and the rotating member 31 rotates, so that the guide column 4 is guided by the lifting guide rail 311 to move up or down.

A bottom end of the guide column 4 abuts against the lifting guide rail 311. When the rotating member 31 rotates, since the relative position of the guide column 4 and the rotating member 31 does not change, the position of the bottom end of the guide column 4 in the lifting guide rail 311 changes due to the change of the position of the lifting guide rail 311, so that the guide column 4 can move up or down.

Figure 2:
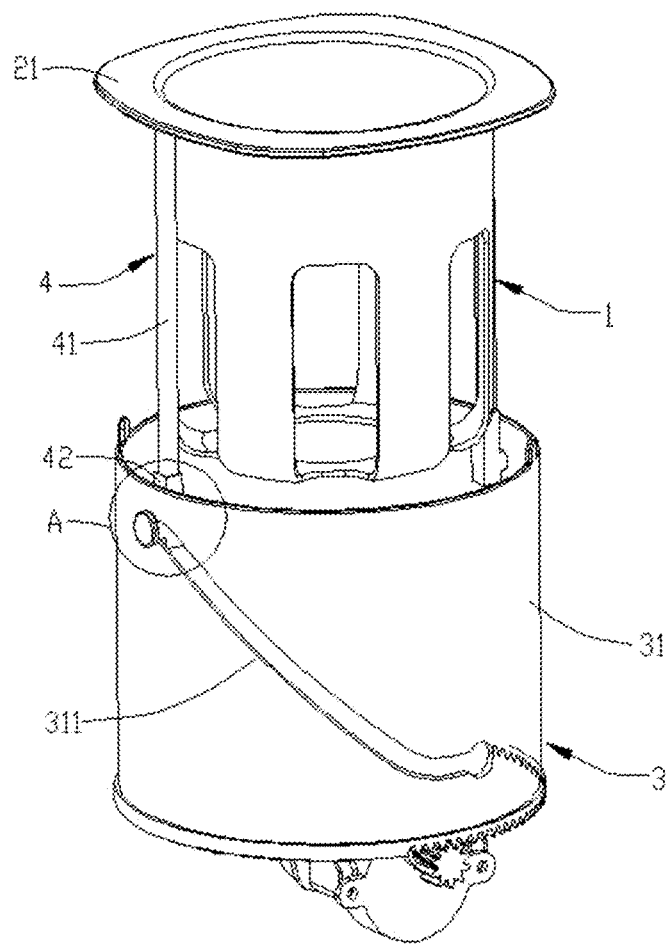
FIG. 2 is a structural schematic diagram of a position A in FIG. 1.
Figure 3:
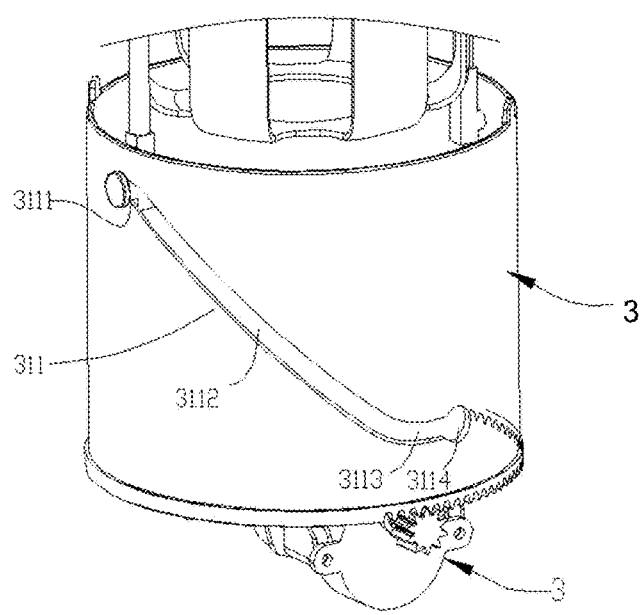

In this embodiment, as shown in FIG. 2 and FIG. 3, preferably, the lifting guide rail 311 includes:
- a first horizontal guide rail 3111, close to the upper end of the rotating member 31;
- a second oblique guide rail 3112, connected to one end of the first horizontal guide rail 3111 and obliquely extending to be arranged on the rotating member 31; and
- a third horizontal guide rail 3113, connected to one end of the second oblique guide rail 3112 and close to the lower end of the rotating member 31.

As an exemplary example in this embodiment, an extending shape of the lifting guide rail 311 limits a movement track of the guide column 4 relative to the lifting guide rail 311.

The first horizontal guide rail 3111 makes the guide column 4 realize smooth transition before moving up, the guide column 4 is guided by the second oblique guide rail 3112 to move up vertically, and the guide column 4 moves to the highest position of the rotating member 31 through the third horizontal guide rail 3113 and can stop at the position of the third horizontal guide rail 3113 relatively stably, thereby preventing the baby bottle basket 2 from falling off when the driving device is in standby.

In this embodiment, as shown in FIG. 3, the lifting guide rail 311 further includes:
- a through hole 3114, connected to one end of the third horizontal guide rail 3113.

The bottom end of the guide column 4 will sink into the through hole 3114 when the baby bottle basket 2 moves up and down, so that the baby bottle basket 2 will not shake easily in the current state, and the baby bottle warmer using the lifting structure can be placed stably.

Preferably, in this embodiment, the through hole 3114 is a round through hole 3114, and a diameter of the through hole 3114 is greater than a width of the lifting guide rail 311, so that the through hole 3114 and the lifting guide rail 311 are slightly staggered. The bottom end of the guide column 4 sinks when being placed in the through hole 3114, so that the current position of a traction column 421 is not in an extending route of the lifting guide rail 311. At this time, the moving range of the bottom end of the guide column 4 is limited by the through hole 3114, so that the baby bottle basket 2 is stable in an unused state.

In this embodiment, as shown in FIG. 1 or FIG. 2, an opening of the baby bottle basket 2 is provided with an outward protruded edge extending and protruding outwards; and
- an upper end of the guide column 4 always abuts against a bottom surface of the outward protruded edge when the baby bottle basket 2 moves up and down.

The upper end of the guide column 4 always abuts against the bottom surface of the outward protruded edge when the baby bottle basket 2 moves up and down, so that the upper end of the guide column 4 can support the baby bottle basket 2 to move up and down.

Figure 4:
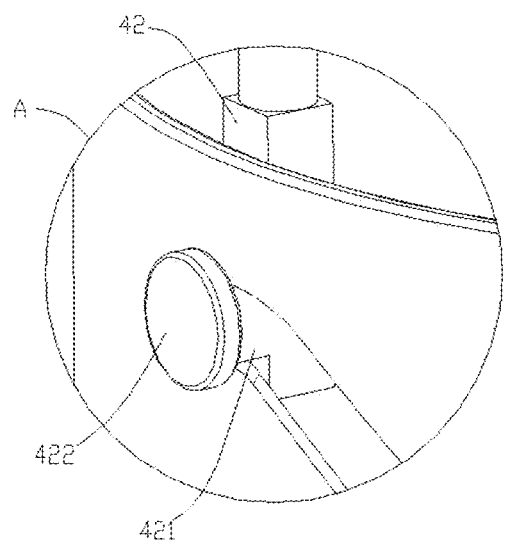
FIG. 4 is a schematic diagram of a setting structure for a driving device in a lifting structure according to this embodiment.

In this embodiment, as shown in FIG. 2 and FIG. 4, the guide column 4 includes:
- a connecting rod 41; and
- a sleeving piece 42, sleeved at a lower end of the connecting rod 42,
- where a traction column 421 is fixed on the sleeving piece 42 and arranged in the lifting guide rail 311.

The guide column 4 is slightly staggered at a vertical position with the rotation of the rotating member 31. In order to make the lower end of the guide column 4 be mounted on the guide column 4 conveniently and stably, the sleeving piece 42 is arranged at the lower end of the guide column 4, and the traction column 421 is arranged on the sleeving piece 42. In this embodiment, the traction column 421 extends horizontally outwards and is perpendicular to the connecting rod 41. When the traction column 421 is arranged in the lifting guide rail 311, the arrangement direction of the connecting rod 41 still keeps the same as the arrangement direction of the rotating member 31, that is, a vertical arrangement direction.

In this embodiment, as shown in FIG. 4, a top cap 422 is arranged on an end part of the traction column 421, and the top cap 422 is in fit with the sleeving piece 42 to clamp and position the traction column 421 in the lifting guide rail 311.

Since a ring-shaped spaced area is formed between the baby bottle basket 2 and the rotating member 31 after the baby bottle basket 2 and the rotating member 31 are assembled, on one hand, the guide column 4 is mounted in the spaced area, and on the other hand, there is a risk that the guide column 4 will accidentally fall off the ring-shaped guide rail between the baby bottle basket 2 and the rotating member 31 and the baby bottle basket 2 will incline, so that the top cap 422 is in fit with the sleeving piece 42 to clamp the traction column 421, and the movement track of the traction column 421 is always in the lifting guide rail 311, thereby reducing the risk that the guide column 4 will accidentally fall off.

Figure 5:
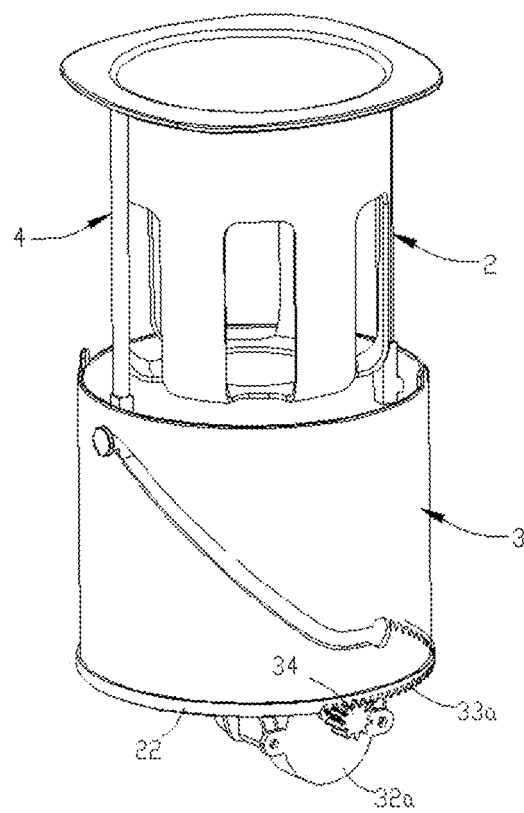
FIG. 5 is another schematic diagram of a setting structure for a driving device in a lifting structure according to this embodiment.

In this embodiment, a device for driving the rotating member 31 to rotate is arranged at the bottom of the rotating member 31. Since the device is a relatively static member, the arrangement position of the heating plate is not affected. As shown in FIG. 5, as an arrangement scheme of a driving device in this embodiment, the lifting device 3 further includes:
- a driving motor 32a, configured to provide a rotating power, where a driving shaft of the driving motor 32 is provided with a transmission gear 34; and
- first rotating teeth 33a, arranged at the bottom of the rotating member 31, where a tooth direction of the first rotating teeth 33a is vertically downward, relatively, the driving motor 32a is horizontally arranged, so that teeth on the transmission gear 34 can be opposite to teeth of the first rotating teeth 33a,
- the transmission gear 34 and the first rotating teeth 33a are mutually engaged, and the driving motor 32 drives the transmission gear 34 to rotate so as to rotate the rotating member 31.

In this embodiment, a ring belt 22 is arranged below the rotating member 2, and the first rotating teeth are formed on the ring belt 22.

Figure 6:
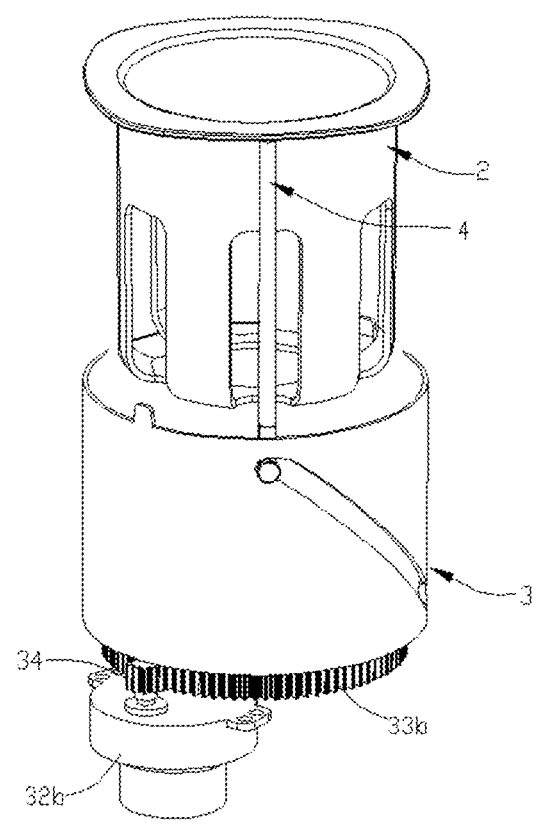
FIG. 6 is an exploded view of an overall structure of a baby bottle warmer according to this embodiment.

As shown in FIG. 6, as another arrangement scheme of a device for driving the rotating member 31 to rotate in this embodiment the lifting device 3 further includes:
- a driving motor 32b, configured to provide a rotating power, where a driving shaft of the driving motor 32 is provided with a transmission gear 34; and second rotating teeth 33b, arranged at the bottom of the rotating member 31, where a tooth direction of the second rotating teeth 33b is horizontally outward, relatively, the driving motor 32 is arranged vertically, so that teeth on the transmission gear 34 can be opposite to teeth of the first rotating teeth 33a, the transmission gear 34 and the first rotating teeth 33a are mutually engaged, and the driving motor 32 drives the transmission gear 34 to rotate so as to rotate the rotating member 31.

According to the disclosure and instruction of the specification, those skilled in the field which the present disclosure belongs to may also change and modify the implementation manner. Therefore, the present disclosure is not limited to the specific implementation manner of the above disclosure and description, and some modifications and changes should also fall within the protection scope of the claims of the present disclosure. In addition, although some specific terms are used in the specification, these terms are only for the convenience of description and do not constitute any limitation to the present disclosure.

What is claimed is:

1. A baby bottle warmer, comprising:
   a machine body;
   a baby bottle basket, arranged at an opening of the machine body; and
   a lifting device, arranged in the machine body;
   wherein the lifting device comprises a rotating member and a guide column movably arranged on the rotating member; the rotating member rotates to move the guide column up or down so as to drive the baby bottle basket to move up or down;
   wherein the guide column comprises:
   a connecting rod; and
   a sleeving piece, sleeved at a lower end of the connecting rod,
   a traction column being fixed on the sleeving piece and arranged in a lifting guide rail wherein a heating plate is arranged in the rotating member.

2. The baby bottle warmer according to claim 1, wherein a top cap is arranged on an end part of the traction column and is in fit with the sleeving piece to clamp and position the traction column in the lifting guide rail.

3. The baby bottle warmer according to claim 1, wherein the lifting device further comprises:
   a driving motor, configured to provide a rotating power, a driving shaft of the driving motor being provided with a transmission gear; and
   rotating teeth, arranged at a bottom of the rotating member, a tooth direction of the rotating teeth being vertically downward,
   the transmission gear and the rotating teeth being mutually engaged, and the driving motor driving the transmission gear to rotate so as to rotate the rotating member.

4. The baby bottle warmer according to claim 1, wherein the lifting device further comprises:
   a driving motor, configured to provide a rotating power, a driving shaft of the driving motor being provided with a transmission gear; and
   rotating teeth, arranged at a bottom of the rotating member, a tooth direction of the rotating teeth being horizontally outward,
   the transmission gear and the rotating teeth being mutually engaged, and the driving motor driving the transmission gear to rotate so as to rotate the rotating member.

5. The baby bottle warmer according to claim 1, wherein the rotating member is a ring-shaped guide cylinder or a ring-like cylindrical structure.

6. The baby bottle warmer according to claim 1, wherein a ring-shaped spaced area is formed between the baby bottle basket and the rotating member, the guide column is arranged in the ring-shaped spaced area.

7. The baby bottle warmer according to claim 1, wherein the lifting guide rail is a slot formed in a peripheral wall of the rotating member.

8. A baby bottle warmer, comprising:
   a machine body;
   a baby bottle basket, arranged at an opening of the machine body; and
   a lifting device, arranged in the machine body,
   wherein the lifting device comprises a rotating member and a guide column movably arranged on the rotating member;
   wherein a lifting guide rail is arranged on a peripheral wall of the rotating member; the lifting guide rail obliquely extends downwards from a part of an upper end of the rotating member as a starting point to a lower end of the rotating member; and the rotating member rotates, so that the guide column is guided by the lifting guide rail to move up or down and the baby bottle basket is driven by the guide column to move up or down wherein a heating plate is arranged in the rotating member.

9. The baby bottle warmer according to claim 8, wherein the lifting guide rail comprises:
   a first horizontal guide rail, close to the upper end of the rotating member;
   a second oblique guide rail, connected to one end of the first horizontal guide rail and obliquely extending to be arranged on the rotating member; and
   a third horizontal guide rail, connected to one end of the second oblique guide rail and close to the lower end of the rotating member.

10. The baby bottle warmer according to claim 9, wherein the lifting guide rail further comprises:
    a through hole, connected to one end of the third horizontal guide rail.

11. A baby bottle warmer, comprising:
    a machine body;
    a baby bottle basket, arranged at an opening of the machine body; and
    a lifting device, arranged in the machine body,
    wherein the lifting device comprises a rotating member and a guide column movably arranged on the rotating member; the rotating member rotates to move the guide column up or down so as to drive the baby bottle basket to move up or down;
    wherein an opening of the baby bottle basket is provided with an outward protruded edge extending and protruding outwards; and an upper end of the guide column always abuts against a bottom surface of the outward protruded edge when the baby bottle basket moves up and down.

* * * * *